United States Patent [19]
Kariya et al.

[11] Patent Number: 5,513,014
[45] Date of Patent: Apr. 30, 1996

[54] VIDEO PRINTER

[75] Inventors: Izumi Kariya; Hidehiko Funayama, both of Kanagawa, Japan

[73] Assignee: Sony Corporation, Tokyo, Japan

[21] Appl. No.: 295,440

[22] Filed: Aug. 25, 1994

[30] Foreign Application Priority Data

Aug. 31, 1993 [JP] Japan ................... 5-216315

[51] Int. Cl.⁶ .......................... H04N 1/40; H04N 1/407; H04N 1/23
[52] U.S. Cl. .................. 358/448; 358/296; 347/188; 347/193
[58] Field of Search ........................ 358/401, 448, 358/455, 468, 296, 503; 382/293; 347/193, 188, 213; 400/120.13

[56] References Cited

U.S. PATENT DOCUMENTS

| | | | |
|---|---|---|---|
| 4,516,135 | 5/1985 | Todoh . | |
| 4,890,120 | 12/1989 | Sasaki et al. | 347/193 |
| 5,075,785 | 12/1991 | Sugishima | 358/448 |

FOREIGN PATENT DOCUMENTS

| | | |
|---|---|---|
| 0267805 | 5/1088 | European Pat. Off. . |
| 0482790 | 4/1992 | European Pat. Off. . |
| 2207023 | 1/1989 | United Kingdom . |

*Primary Examiner*—Scott A. Rogers
*Attorney, Agent, or Firm*—Ronald P. Kananen

[57] ABSTRACT

A video printer for transferring an image from an ink ribbon to a print sheet has a print medium detector for detecting the type of a print medium and outputting medium data indicative of the detected type, a memory for storing image data to be printed, and a keyboard for inputting reversal information indicating whether the image data stored in the memory are to be reversed or not. A reversing unit selectively outputs the image data stored in the memory and reversed image data which are a reversal of the image data stored in the memory. A gamma correcting circuit adjusts image density of the image data with image density adjusting data, or a gamma curve, selected from a plurality of sets of image density adjusting data or gamma curves each having a different image density characteristic, and outputs the image data with the adjusted image density. A thermal head transfers an image represented by the image data with the adjusted image density to the print medium with an ink ribbon. The video printer has a controller for controlling the reversing unit based on the reversal information and controlling the gamma correcting circuit to select the image density adjusting data based on both the reversal information and the medium data.

5 Claims, 5 Drawing Sheets

FIG. 4A Input Signal Gradation Curve

FIG. 4B Print Medium Coloring Curve

FIG. 4C γ Curve

VIDEO PRINTER

BACKGROUND OF THE INVENTION

The present invention relates to a video printer for printing video information on a transfer print medium.

There has heretofore been known a thermal transfer printer which is supplied with an image signal from an image data input device such as a camera, a video tape recorder, or the like, and heats and presses a thermal transfer ribbon against a print sheet with a thermal head to print an image on the print sheet. The thermal transfer ribbon and the print sheet are referred to as a print medium. Such print mediums include a non-transfer print medium for printing an image on a print sheet and a transfer print medium for printing an image on a print sheet and then transferring the printed image from the print sheet to another object.

A conventional process of printing an image on a transfer print medium with a thermal transfer printer will be described below. The transfer print medium has a print sheet which is composed of a base sheet and a transfer sheet applied to the base sheet. The transfer sheet doubles as a sheet on which an image is to be printed. After an image has been printed on the transfer sheet of the print sheet, only the transfer sheet with the printed image is applied from the base sheet to an object such as a cup, a piece of cloth, or the like by way of thermal transfer. The image printed on the transfer sheet now appears as if printed on the object itself. The image transferred to the object is a horizontal reversal of the image which is printed on the transfer sheet.

Even if the object has a curved surface such as a side wall of a cup, an image can easily be transferred to the curved surface by printing the image on a print sheet and then applying only the transfer sheet to the object by way of thermal transfer.

The thermal transfer printer is usually designed to print images on non-transfer print mediums. Therefore, the thermal transfer printer has conventionally effected a single gamma correction process so that an image printed on the print sheet of a non-transfer print medium can clearly be seen, or stated otherwise, has a proper image density. However, if an image is printed on a transfer print medium by the thermal transfer printer and then transferred to an object, since the image has not been gamma-corrected based on the transfer characteristics of the transfer print medium, the quality of the transferred image depends upon the characteristics of the transfer print medium itself.

Specifically, inasmuch as the gamma correction carried out on the conventional thermal transfer printer has single characteristics for printing images on non-transfer print mediums, the same gamma correction is effected by the thermal transfer printer on images printed on transfer print mediums whose print sheets have transfer sheets and on images printed on non-transfer print mediums whose print sheets have no transfer sheets. Accordingly, images formed on transfer print mediums often tend to have improper densities.

Image transfer from transfer print mediums to objects is also disadvantageous in that an image transferred from a transfer print medium to an object is a horizontal reversal, i.e., a mirror-image reversal, of the original image.

SUMMARY OF THE INVENTION

It is therefore an object of the present invention to provide a video printer capable of correcting an image density depending on a print medium used and of horizontally reversing an image.

According to the present invention, there is provided a video printer for transferring an image from an ink ribbon to a print sheet, comprising a print medium detecting means for detecting a type of a print medium and outputting medium data indicative of the detected type, a memory means for storing image data to be printed, an input means for inputting reversal information indicating whether the image data stored in the memory means are to be reversed or not, a reversing means for selectively outputting the image data stored in the memory means and reversed image data which are a reversal of the image data stored in the memory means, an adjusting means for adjusting image density of the image data with image density adjusting data selected from a plurality of sets of image density adjusting data each having a different image density characteristic, and outputting the image data with the adjusted image density, a print head for transferring an image represented by the image data with the adjusted image density to the print medium with an ink ribbon, and a control means for controlling the reversing means based on the reversal information and controlling the adjusting means to select the image density adjusting data based on both the reversal information and the medium data.

The print medium detecting means may determine whether the print medium is a transfer print medium or a non-transfer print medium. Specifically, the print medium detecting means may detect a type of the ink ribbon to determine whether the print medium is a transfer print medium or a non-transfer print medium.

The control means may control the reversing means to output the image data stored in the memory means if the reversal information inputted from the inputting means indicates that the image data stored in the memory means are to be reversed, and to output the reversed image data if the reversal information inputted from the inputting means indicates that the image data stored in the memory means are not to be reversed.

The control means may control the reversing means to output the image data stored in the memory means if the reversal information inputted from the inputting means indicates that the image data stored in the memory means are to be reversed, and to output the reversed image data if the reversal information inputted from the inputting means indicates that the image data stored in the memory means are not to be reversed, and also may control the adjusting means to adjust the image density of the image data with a first set of image density adjusting data if the medium data indicate that the print medium is a non-transfer print medium, control the adjusting means to adjust the image density of the image data with a second set of image density adjusting data if the medium data indicate that the print medium is a non-transfer print medium and also if the reversal information inputted from the inputting means indicates that the image data stored in the memory means are not to be reversed, and control the adjusting means to adjust the image density of the image data with a third set of image density adjusting data if the medium data indicate that the print medium is a non-transfer print medium and also if the reversal information inputted from the inputting means indicates that the image data stored in the memory means are to be reversed.

DETAILED DESCRIPTION OF THE PREFERRED EMBODIMENT

Figure 1:
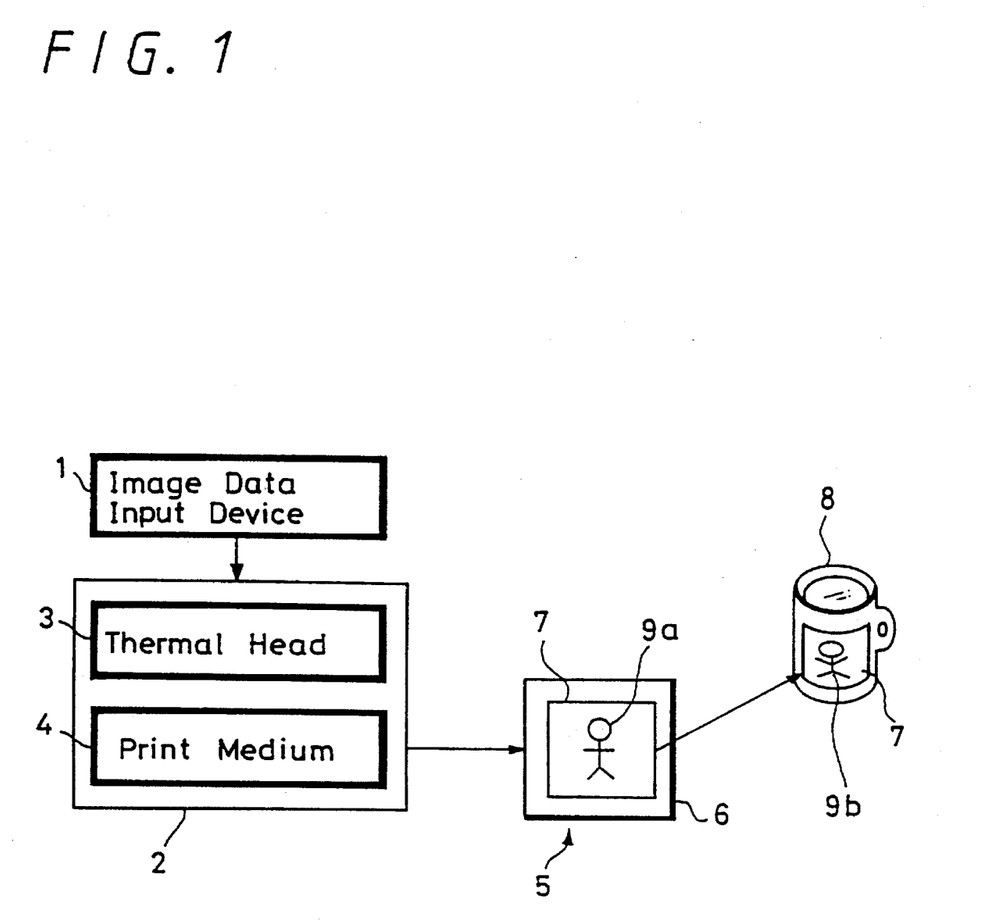
FIG. 1 is a schematic view, partly in block form, of a print system which incorporates a video printer according to the present invention.

A video printer according to the present invention is typically incorporated in a print system as shown in FIG. 1. As shown in FIG. 1, the print system includes an image data input device 1 such as camera, a video tape recorder, or the like, and a thermal printer 2, i.e., a video printer according to the present invention, which is supplied with image data from the image data input device 1. The thermal printer 2 has a thermal head 3 and a print medium 4. The print medium 4 comprises an ink ribbon (not shown) and a print sheet 5. The thermal head 3 heats and presses the ink ribbon against the print sheet 5 to print a desired image on the print sheet 5.

The print sheet 5 comprises a base sheet 6 and a transfer sheet 7 applied to the base sheet 6, the transfer sheet 7 doubling as a sheet on which an image is to be printed. After an image 9a has been printed on the transfer sheet 7, only the transfer sheet 7 is transferred from the base sheet 6 to an object 8 such as a cup or the like by way of thermal transfer. It is necessary that a nonlinearity correction, i.e., gamma correction, be effected on the density of the image data in the thermal printer 2 in order to make clear a transferred image 9b printed on the transfer sheet 7 after it has been transferred to the object 8. After the transfer sheet 7 has been transferred to the object 8, the transferred image 9b on the thermal sheet 7 is a horizontal reversal, or a mirror-image reversal, of the image 9a.

In the print system shown in FIG. 1, in order to optimize the print density of the transferred image 9b on the transfer sheet 7 and also to make the transferred image 9b look properly, the thermal printer 2 or the video printer according to the present invention determines whether the print medium 4 is a transfer print medium, which is composed of an ink ribbon and a print sheet, or a non-transfer print medium, i.e., an ordinary print medium, and also determines whether an image printed on the print medium 4 needs to be horizontally reversed. Depending on the determined results, the thermal printer 2 corrects the print density of the image data and horizontally reverses the image data.

Figure 2:
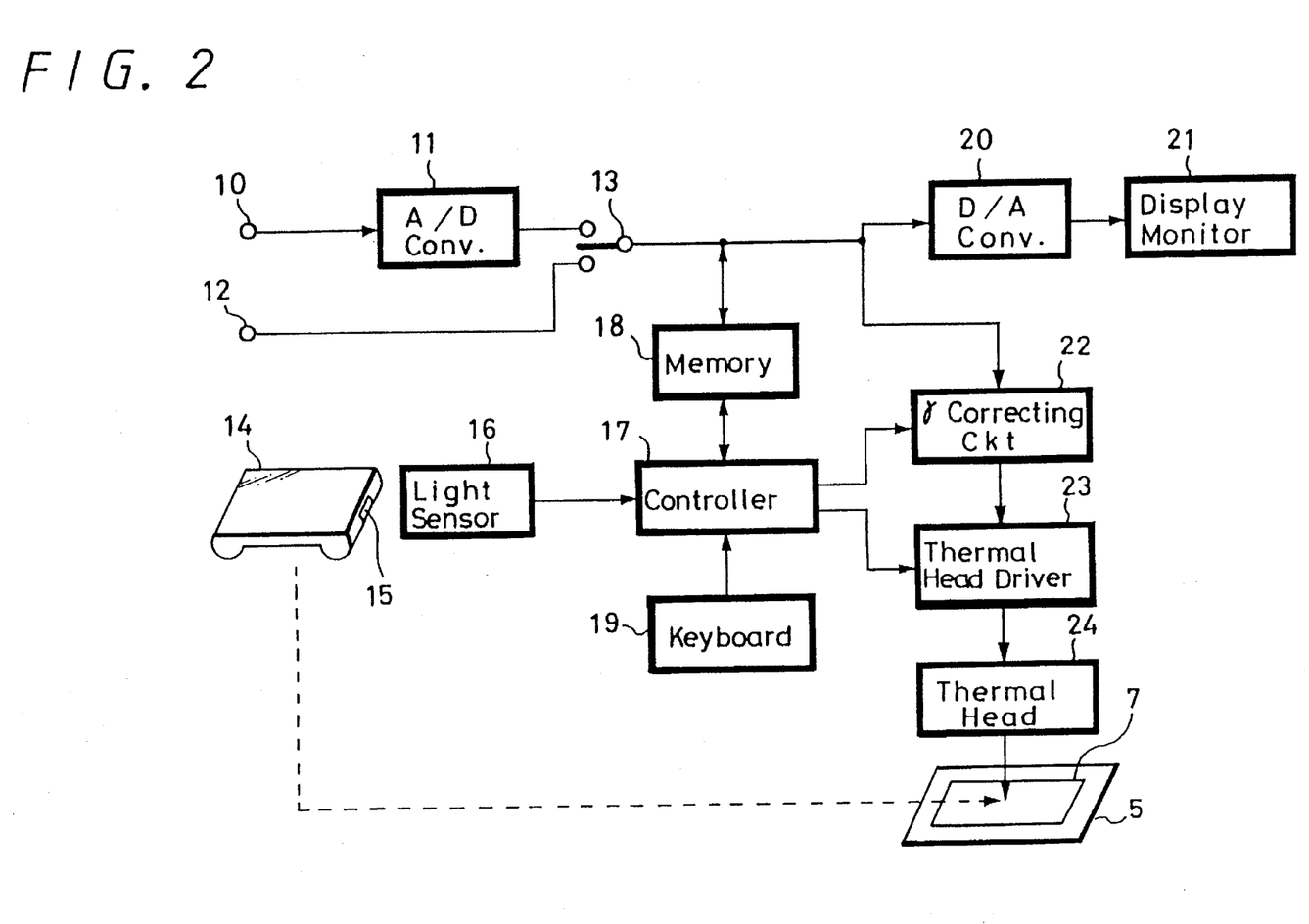
FIG. 2 is a block diagram of the video printer according to the present invention.

The thermal printer 2 is of a circuit arrangement as shown in FIG. 2. As shown in FIG. 2, the thermal printer 2 has an analog-to-digital (A/D) converter 11 for converting an analog input signal supplied to an analog input terminal 10 into a digital input signal. The digital input signal from the A/D converter 11 is supplied to a fixed contact of a selector switch 13. A digital input signal supplied to a digital input terminal 12 is supplied to the other fixed contact of the selector switch 13. The selector switch 13 can therefore select either the analog input signal supplied to the analog input terminal 10 or the digital input signal supplied to the digital input terminal 12.

The analog input terminal 10 or the digital input terminal 12 is supplied with an analog input signal or a digital input signal from the image data input device 1 such as camera, a video tape recorder, or the like. The analog input signal or the digital input signal is a positive or negative image input signal.

A color thermal transfer ink ribbon cartridge 14 which can be loaded into the thermal printer 2 has a light reflector 15 on a side thereof. The thermal printer 2 has a light sensor 16 of the reflective type composed of a light-emitting element and a light-detecting element. When the color thermal transfer ink ribbon cartridge 14 is loaded into the thermal printer 2, the light-emitting element of the light sensor 16 applies light to the light reflector 15, and the light-detecting element thereof detects light reflected by the light reflector 15. The light sensor 16 is now turned on, supplying data representing that the color thermal transfer ink ribbon cartridge 14 is part of a transfer print medium to a controller 17. If the color thermal transfer ink ribbon cartridge 14 is part of a non-transfer print medium, then no light reflector 15 is present on the side of the color thermal transfer ink ribbon cartridge 14. Therefore, the light sensor 16 remains turned off, indicating that the color thermal transfer ink ribbon cartridge 14 is part of a non-transfer print medium.

If the thermal printer 2 detected only the type of the color thermal transfer ink ribbon cartridge 14, then the user may erroneously set a print sheet 5 which is part of a non-transfer print medium when a color thermal transfer ink ribbon cartridge 14 which is part of a transfer print medium is actually loaded. To solve this problem, a print sheet 5 may also have a light reflector, and the thermal printer 2 may have another light sensor for detecting whether a print sheet 5 which has been set is part of a transfer print medium. If signals from the light sensors do not coincide with each other, then the thermal printer 2 may issue an alarm representing incompatibility between the loaded color thermal transfer ink ribbon cartridge 14 and the set print sheet 5.

A memory 18 temporarily stores the digital input signal supplied from the selector switch 13. The controller 17 comprises a central processing unit (CPU) for controlling the thermal printer 2. The controller 17 reads the digital input signal from the memory 18. A digital-to-analog (D/A) converter 20 converts the digital input signal into an analog signal, and supplies the analog signal to a display monitor 21. The display monitor 21 displays an image based on the supplied analog signal and any character information superimposed on the image for the user to visually determine whether the digital input signal needs to be horizontally reversed or not. A keyboard 19 connected to the controller 17 is used by the user to enter information indicative of whether the digital input signal needs to be horizontally reversed or not based on the image displayed by the display monitor 21.

The controller 17 controls corrective operation of a gamma correcting circuit 22 based on the data from the light sensor 16 indicating whether the color thermal transfer ink ribbon cartridge 14 is part of a transfer print medium, and also on the information from the keyboard 19 indicating whether the digital input signal needs to be horizontally reversed. The gamma correcting circuit 22 effects gamma correction on the digital input signal so as not to be affected by coloring characteristics of the transfer print medium composed of the ink ribbon in the color thermal transfer ink ribbon cartridge 14 and the print sheet 5 (see FIG. 1) for optimizing the density of the transferred image 9b which will be printed on the print sheet 5 by the ink ribbon that is pressed against the print sheet 5 by the thermal head 3. In this embodiment, the thermal printer 2 varies gamma correction characteristics depending on whether the ink ribbon and the print sheet 5 are a transfer print medium or a non-transfer print medium, and also on whether the digital input signal needs to be horizontally reversed. Specifically, the gamma correcting circuit 22 selectively outputs a plurality of output signals having respectively different gamma curves.

The digital input signal is gamma-corrected by the gamma correcting circuit 22 depending on the print medium used, and then supplied through a thermal head driver 23 to a thermal head 24 which corresponds to the thermal head 3 shown in FIG. 1. The thermal head 24 heats and presses the ink ribbon in the color thermal transfer ink ribbon cartridge 14 against the print sheet 5, thereby forming an image 9a on the transfer sheet 7 of the print sheet 5. Then, only the transfer sheet 7 with the image 9a formed thereon is transferred from the base sheet 6 to the object 8 by thermal transfer, whereupon a transferred image 9b is printed on the object 8.

Figure 3:
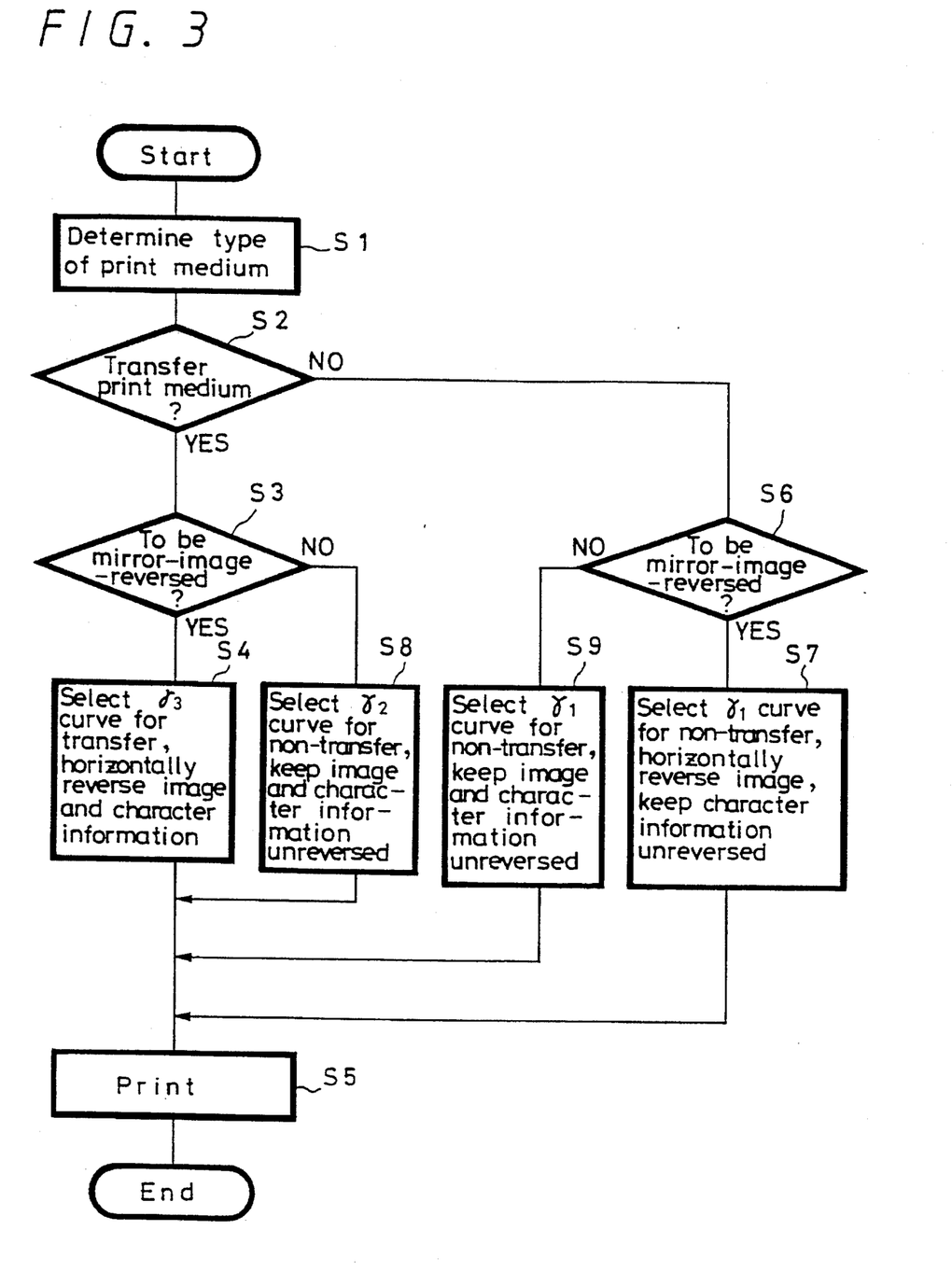
FIG. 3 is a flowchart of an operation sequence of the video printer according to the present invention.

The thermal printer shown in FIG. 2 will operate according to an operation sequence shown in FIG. 3. After the thermal printer has started operating, the controller 17 determines whether the print medium used is a transfer print medium or a non-transfer print medium in a step S1. The print medium used is a transfer print medium if the light sensor 16 detects the light reflector 15 on the side of the color thermal transfer ink ribbon cartridge 14. If the print medium is a transfer print medium, then the controller 17 determines whether the digital input signal needs to be horizontally reversed, i.e., mirror-image-reversed, in a step S2. More specifically, the user visually recognizes an image displayed on the display monitor 21 based on the digital input signal, particularly any character information superimposed on the image, and enters information indicative of whether the digital input signal needs to be horizontally reversed through the keyboard 19. The controller 17 refers to such information entered through the keyboard 19 to determine whether the digital input signal needs to be horizontally reversed.

If the digital input signal needs to be horizontally reversed, then the controller 17 selects a $g_3$ curve for transfer, and controls horizontal readout addresses for the data in the memory 18 to horizontally reverse the mirror-image data in the memory 18 for thereby horizontally reversing the image and character information displayed on the display monitor 21, in a step S4.

The thermal printer 2 can print character information such as of a date or the like outside an image print area on the transfer sheet 7. Such character information is superimposed on other image data in the memory 18. In the step S4, the controller 17 also horizontally reverses such character information as the mirror image is horizontally reversed.

After the step S4, the controller 17 controls the thermal head driver 23 to cause the thermal head 24 to print the gamma-corrected and horizontally reversed data on the print sheet 5 in a step S5. Specifically, the ink ribbon in the color thermal transfer ink ribbon cartridge 14 is pressed against the transfer sheet 7 by the thermal head 24 to print an image 9a on the transfer sheet 7. Thereafter, the operation sequence is brought to an end. Then, the user can transfer an image 9b from the print sheet 5 to the object 8.

If the print medium is a non-transfer print medium in the step S2, then the controller 17 determines whether the digital input signal needs to be horizontally reversed, i.e., mirror-image-reversed, in a step S6. More specifically, as with the step S3, the user visually recognizes an image displayed on the display monitor 21 based on the digital input signal, particularly any character information superimposed on the image, and enters information indicative of whether the digital input signal needs to be horizontally reversed through the keyboard 19. The controller 17 refers to such information entered through the keyboard 19 to determine whether the digital input signal needs to be horizontally reversed. If the digital input signal needs to be horizontally reversed, then the controller 17 selects a $g_1$ curve for non-transfer, and horizontally reverses the mirror-image data in the memory 18, but keeps the character information unreversed, in a step S7. The horizontally reversed image and the unreversed character information will then be printed on the non-transfer print medium in the step S5.

The step S7 is included in view of applications in which an image and character information are printed on a badge or the like. Specifically, such an image and character information are printed, not on an ordinary print sheet, but on a material which is the same as the transfer print medium, and the printed image will not be transferred but will be used as a badge or the like itself with the character information kept unreversed.

If the digital input signal does not need to be horizontally reversed in the step S6, then the controller 17 selects the $g_1$ curve for non-transfer, and keeps the displayed image and character information unreversed, in a step S9. The image and character information which are not reversed will then be printed on the non-transfer print medium in the step S5. After step S5, the operation sequence is ended.

If the digital input signal does not need to be horizontally reversed in the step S3, then the controller 17 selects a $g_2$ curve for non-transfer, and keeps the displayed image and character information unreversed, in a step S8. The image 9a which is not reversed will then be printed on the transfer sheet 7 of the non-transfer print medium in the step S5. After the step S5, the operation sequence is ended.

Figure 4A:
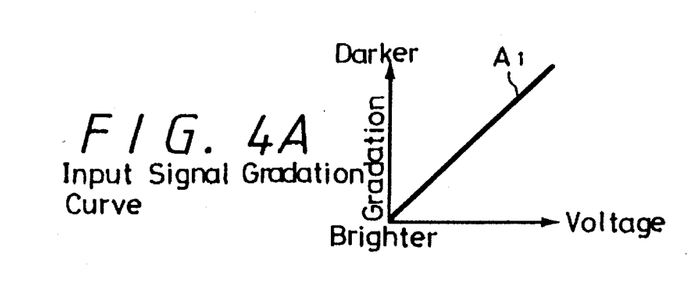
FIGS. 4A through 4F are diagrams showing various characteristic curves used in the video printer according to the present invention.
Figure 4B:
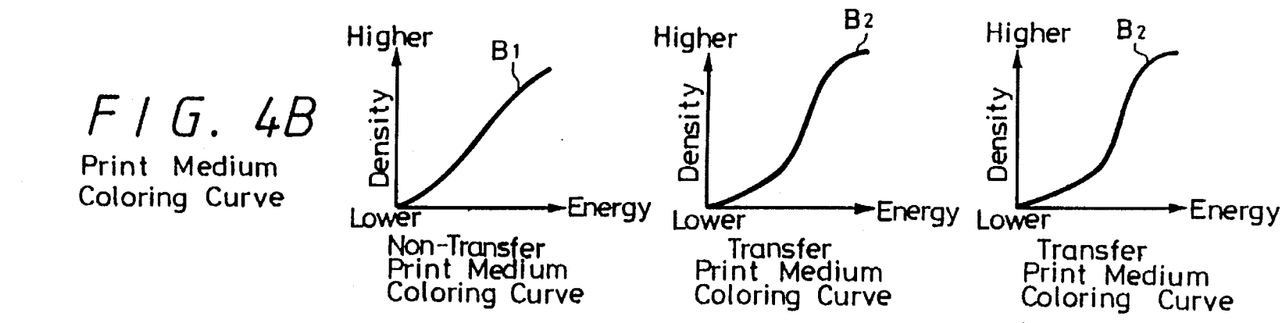

The gamma correction is carried out by the thermal printer according to characteristic curves shown in FIGS. 4A through 4F. FIG. 4A shows a input signal gradation curve $A_1$ indicative of input signal gradations with respect to voltages of the digital input signal. The digital input signal is displayed on the display monitor 21, and the gradation level varies from a bright level to a dark level in proportion to the digital input signal voltage. FIG. 4B shows different print medium coloring curves $B_1$, $B_2$ according to different print mediums each composed of an ink ribbon and a print sheet. The print medium coloring curve $B_1$ represents the coloring characteristics of the non-transfer print medium, and the print medium coloring curve $B_2$ represents the coloring characteristics of the transfer print medium. The print medium coloring curve $B_1$ is used for printing an image on an ordinary print sheet. The print medium coloring curve $B_2$, which is used for printing an image on a transfer print medium, indicates higher image densities with respect to the applied energy than the print medium coloring curve $B_1$ because the transferred image 9b will be seen from the reverse side of the transfer sheet 7 after it is transferred.

Figure 4C:
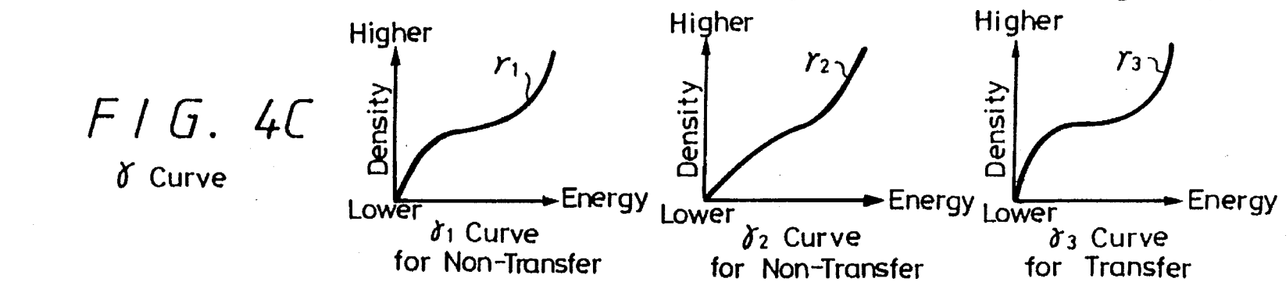
Figures 4D, 4E:
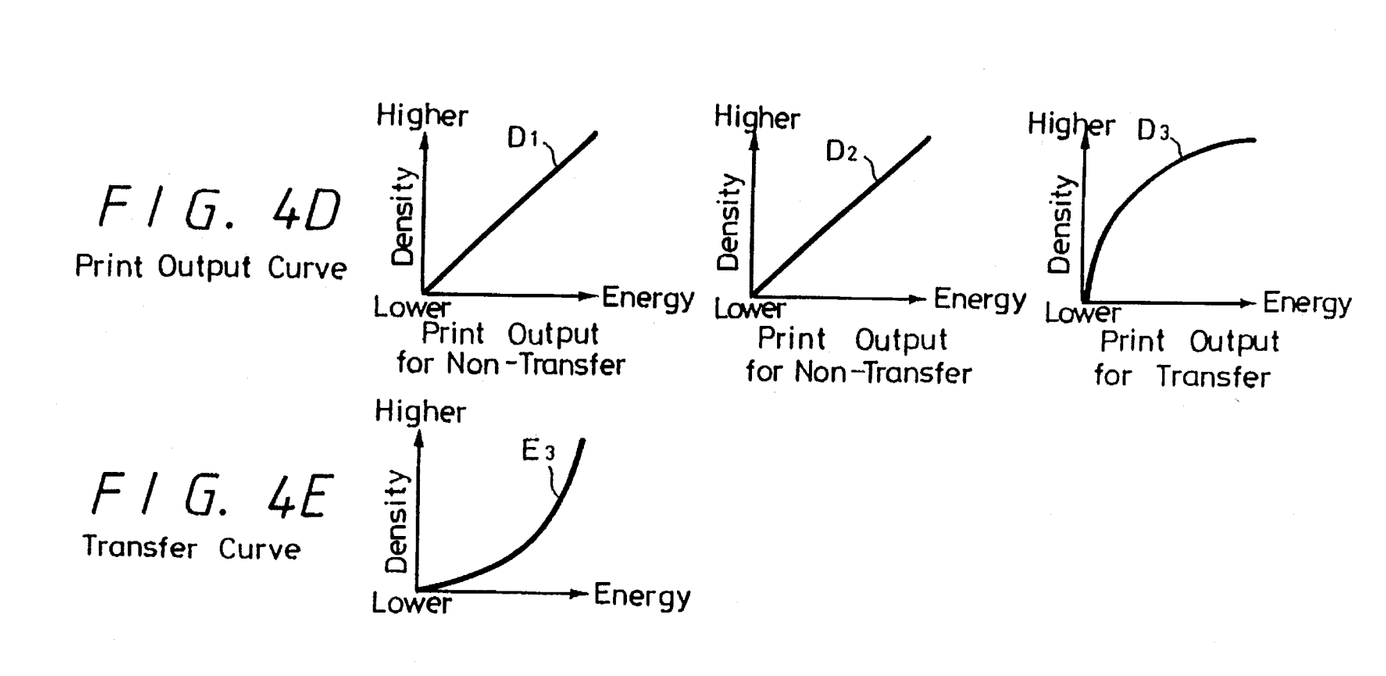

FIG. 4C shows different gamma curves according to different print mediums. Specifically, the illustrated gamma curves correspond respectively to the $g_1$ curve for non-transfer selected in the step S7 shown in FIG. 3, the $g_2$ curve for non-transfer selected in the step S8 shown in FIG. 3, and the $g_3$ curve for transfer selected in the step S4 shown in FIG. 3. FIG. 4D show different print output curves $D_1$–$D_3$. The print output curve $D_1$, which is used for printing an image for non-transfer, represents image densities which are outputted with respect to the applied energy in a pattern corresponding to the gradation curve $A_1$ shown in FIG. 4A. The print output curve $D_1$ corresponds to the gradation curve $A_1$ in order to allow the $g_1$ curve for non-transfer shown in FIG. 4C to cancel out the non-transfer print medium coloring curve $B_1$ shown in FIG. 4B, so that an image for non-transfer can be printed on the non-transfer print medium. The print output curve $D_2$, which is used for printing an image for non-transfer, also represents image densities which are outputted with respect to the applied energy in a pattern corresponding to the gradation curve $A_1$ shown in FIG. 4A. The print output curve $D_2$ corresponds to the gradation curve $A_1$ in order to allow the $g_2$ curve for non-transfer shown in FIG. 4C to cancel out the transfer print medium coloring curve $B_2$ shown in FIG. 4B, so that an image for non-transfer can be printed on the transfer print medium without being subsequently transferred.

Figure 4F:
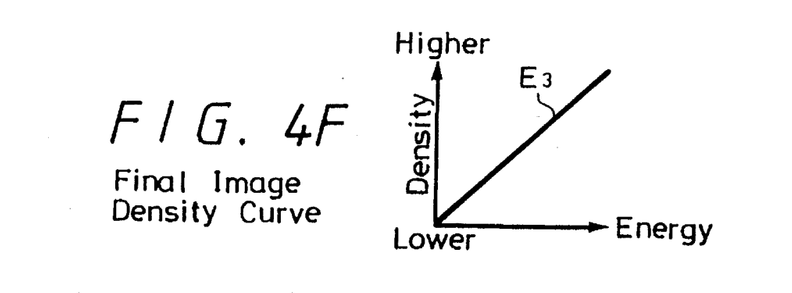

FIG. 4E shows a transfer curve $E_3$ representing energy-dependent image densities which affect a transferred image when the transfer sheet 7 is transferred from the print sheet 5 to the object 8. FIG. 4F shows a final image density curve $F_3$ representing energy-dependent image densities of a transferred image on the transfer sheet 7 which is transferred from the print sheet 5 to the object 8.

As described above, when the image 9b on the transfer sheet 7 is to be transferred to the object 8 after the image 9a has been printed on the transfer sheet 7 of the non-transfer print medium, not only the print medium coloring curve $B_2$ shown in FIG. 4B is employed, but also the $g_3$ curve for transfer shown in FIG. 4C is employed in view of the transfer curve $E_3$ shown in FIG. 4E. In this manner, the image according to the final image density curve $F_3$ shown in FIG. 4F can be outputted in a fashion corresponding to the gradation curve $A_1$ shown in FIG. 4A. The image can now be transferred using the transfer print medium.

In the above illustrated embodiment, when the print medium is determined as the transfer print medium based on a signal from the light sensor 16 which detects the light reflector 15 on the color thermal transfer ink ribbon cartridge 14 and the image displayed on the display monitor 21 needs to be horizontally reversed, the user enters information indicative of mirror-image-reversed data through the keyboard 19, and the controller 17 corrects the density of the image data according to the $g_3$ curve for transfer and horizontally reverses the image data. Consequently, the density of the printed image 9b on the transferred transfer sheet 7 is optimized, and the user can see the horizontally reversed image.

Furthermore, the density correction of the non-transfer print medium, the density correction of the transfer print medium, and the horizontal reversal or non-reversal of the image are carried out according to the $g_1$ curve for non-transfer, the $g_2$ curve for non-transfer, and the $g_3$ curve for transfer. Therefore, the density correction and the horizontal reversal or non-reversal of the image can be effected depending on the print medium used. The printed density of the image 9a on the transfer sheet 7 when the non-transfer print sheet is used or when the transfer print sheet is used, but the image is not transferred, can be optimized. The printed density of the image 9b on the transfer sheet 7 after it has been transferred can also be optimized, and the image can be horizontally reversed.

Moreover, the $g_1$ curve for non-transfer is corrected so as not to be affected by the non-transfer print medium coloring curve $B_1$, the $g_2$ curve for non-transfer is corrected so as not to be affected by the transfer print medium coloring curve $B_2$, and the $g_3$ curve for transfer is corrected so as not to be affected by the transfer print medium coloring curve $B_2$ and the transfer curve $E_3$ for the transfer print medium. Therefore, the printed image density can be corrected into a uniform density in any of the above correcting modes. The printed density of the image 9a on the transfer sheet 7 can thus be optimized not only when the non-transfer print medium is used, but also when the transfer print medium is used and no image transfer is carried out. The printed density of the image 9b on the transfer sheet 7 after it has been transferred can also be optimized, and the image can be horizontally reversed.

In the illustrated embodiment, the user visually checks the image displayed on the display monitor 21 to determine whether the input signal needs to be horizontally reversed, and then enters corresponding information through the keyboard 19 for the controller 17 to refer to. However, the controller 17 may refer to horizontal reversal data stored in the memory 18 to determine whether the input signal stored in the memory 18 is to be horizontally reversed or not.

In the illustrated embodiment, the controller 17 determines whether the print medium is a transfer print medium or not based on a signal from the light sensor 16 which detects the light reflector 15 on the color thermal transfer ink ribbon cartridge 14. However, the light reflector 15 may be attached to the print sheet 5 for being detected by the light sensor 16. Such a modification is effective in preventing a g curve for non-transfer from being used with respect to the transfer print medium.

While the light sensor 16 is a reflective sensor, a hole may be defined in the side of the color thermal transfer ink ribbon cartridge 14, and a transmissive light sensor may be employed to detect whether the print medium is a transfer print medium based on light passing through the hole in the side of the color thermal transfer ink ribbon cartridge 14. Alternatively, a hole may be defined in the print sheet 5, and a transmissive light sensor may be employed to detect whether the print medium is a transfer print medium based on light passing through the hole in the print sheet 5.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A video printer for transferring an image from an ink ribbon to a print sheet, comprising:

print medium detecting means for detecting a type of a print medium and outputting medium data indicative of the detected type;

memory means for storing image data to be printed;

input means for inputting reversal information indicating whether the image data stored in said memory means are to be reversed or not;

reversing means for selectively outputting the image data stored in said memory means and reversed image data which are a reversal of the image data stored in said memory means;

adjusting means for adjusting image density of said image data with image density adjusting data selected from a plurality of sets of image density adjusting data each having a different image density characteristic, and outputting the image data with the adjusted image density;

a print head for transferring an image represented by the image data with the adjusted image density to the print medium with an ink ribbon; and control means for controlling said reversing means based on said reversal information and controlling said adjusting means to select the image density adjusting data based on both said reversal information and said medium data.

2. The video printer according to claim 1, wherein said print medium detecting means comprises means for determining whether said print medium is a transfer print medium or a non-transfer print medium.

3. The video printer according to claim 2, wherein said print medium detecting means comprises means for detecting a type of the ink ribbon to determine whether said print medium is a transfer print medium or a non-transfer print medium.

4. The video printer according to claim 1, wherein said control means comprises means for controlling said reversing means to output the image data stored in said memory means if the reversal information inputted from said inputting means indicates that the image data stored in said memory means are not to be reversed, and to output the reversed image data if the reversal information inputted from said inputting means indicates that the image data stored in said memory means are to be reversed.

5. The video printer according to claim 4, wherein said control means comprises:

means for controlling said reversing means to output the image data stored in said memory means if the reversal information inputted from said inputting means indicates that the image data stored in said memory means are not to be reversed, and to output the reversed image data if the reversal information inputted from said inputting means indicates that the image data stored in said memory means are to be reversed; and means for controlling said adjusting means to adjust the image density of said image data with a first set of image density adjusting data if said medium data indicate that said print medium is a non-transfer print medium, controlling said adjusting means to adjust the image density of said image data with a second set of image density adjusting data if said medium data indicate that said print medium is a non-transfer print medium and also if the reversal information inputted from said inputting means indicates that the image data stored in said memory means are not to be reversed, and controlling said adjusting means to adjust the image density of said image data with a third set of image density adjusting data if said medium data indicate that said print medium is a non-transfer print medium and also if the reversal information inputted from said inputting means indicates that the image data stored in said memory means are to be reversed.

\* \* \* \* \*